United States Patent
Thota et al.

(10) Patent No.: US 12,333,338 B2
(45) Date of Patent: Jun. 17, 2025

(54) ASYNCHRONOUS MULTI-TENANT MODEL INFERENCING ON STREAMING DATABASES

(71) Applicant: Walmart Apollo, LLC, Bentonville, AR (US)

(72) Inventors: Saigopal Thota, Fremont, CA (US); Mridul Jain, Cupertino, CA (US); Navinder Pal Singh Brar, Abohar (IN); Pragya Jain, Indore (IN); Giridhar Addepalli, Bangalore (IN); Gajendra Alias Nishad Kamat, Los Altos, CA (US); Santos Kumar Das, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 849 days.

(21) Appl. No.: 17/508,857

(22) Filed: Oct. 22, 2021

(65) Prior Publication Data
US 2023/0128987 A1    Apr. 27, 2023

(51) Int. Cl.
*G06F 9/48*    (2006.01)
*G06F 9/50*    (2006.01)

(52) U.S. Cl.
CPC .......... *G06F 9/5016* (2013.01); *G06F 9/4881* (2013.01); *G06F 2209/485* (2013.01); *G06F 2209/5018* (2013.01)

(58) Field of Classification Search
CPC ...... G06F 1/329; G06F 9/4843; G06F 9/4881; G06F 9/4887; G06F 9/542; G06F 16/1734; H04L 41/06; H04L 41/0604
See application file for complete search history.

(56) References Cited

U.S. PATENT DOCUMENTS

| | | | |
|---|---|---|---|
| 9,836,599 B2 * | 12/2017 | Sheldon | G06F 21/554 |
| 11,726,999 B1 * | 8/2023 | Vig | G06F 16/24552 707/718 |
| 2016/0140589 A1 | 5/2016 | Deshpande et al. | |

(Continued)

OTHER PUBLICATIONS

Brar, N., "Building Real-Time Data Processing and Model Inferencing Platform With Kafka Streams," Walmart 2019, 24 pgs. 2019.

*Primary Examiner* — Andy Ho
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform ingesting streaming events for processing by multiple models; mapping each of the streaming events to a model of the multiple models; storing each of the streaming events in a respective queue in a respective sequence store, such that a respective one of the multiple models retrieves (i) a respective one of the streaming events in the respective sequence store associated with the respective one of the multiple models and (ii) a respective key corresponding to the respective one of the streaming events from a leaf store, to asynchronously perform the respective machine-learning inferencing, wherein the multiple models run independently and in parallel on multi-tenant threads. Other embodiments are disclosed.

20 Claims, 6 Drawing Sheets

(56) References Cited

U.S. PATENT DOCUMENTS

| | | |
|---|---|---|
| 2019/0087239 A1 | 3/2019 | Adibowo |
| 2020/0265509 A1 | 8/2020 | Kumar Addepalli et al. |
| 2021/0117249 A1 | 4/2021 | Doshi et al. |
| 2022/0318647 A1* | 10/2022 | Ashrafzadeh ............ G06N 5/04 |

* cited by examiner

ASYNCHRONOUS MULTI-TENANT MODEL INFERENCING ON STREAMING DATABASES

TECHNICAL FIELD

This disclosure relates generally to asynchronous multi-tenant model inferencing on streaming databases.

BACKGROUND

In an event processing system, different models that process events can run at different processing rates. Streaming events can form a queue waiting to be ingested by each model due to the different processing rates. In such circumstances, slower running models can bottleneck the queue and limit the processing on faster running models.

BRIEF DESCRIPTION OF THE DRAWINGS

To facilitate further description of the embodiments, the following drawings are provided in which.

Figure 1:
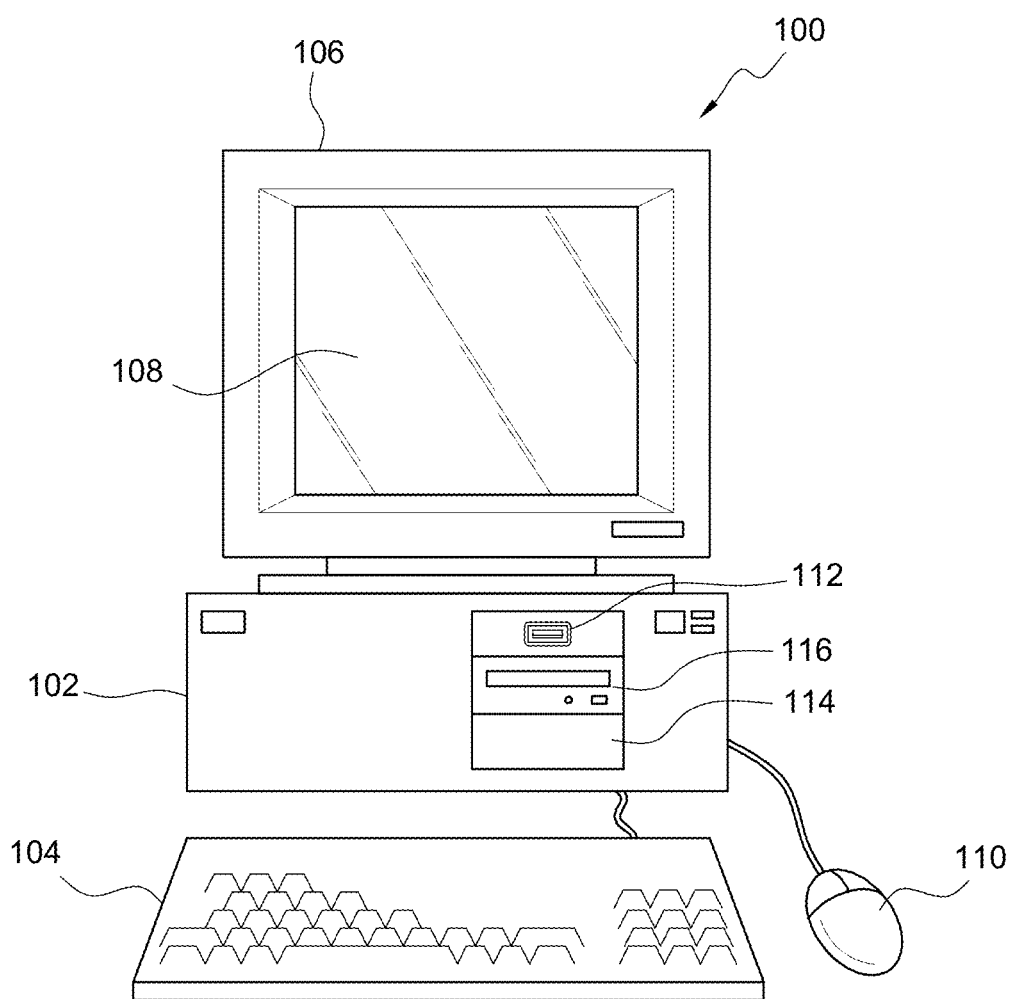
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 second, 10 seconds, 1 minute, or another suitable time delay period.

DESCRIPTION OF EXAMPLES OF EMBODIMENTS

Figure 2:
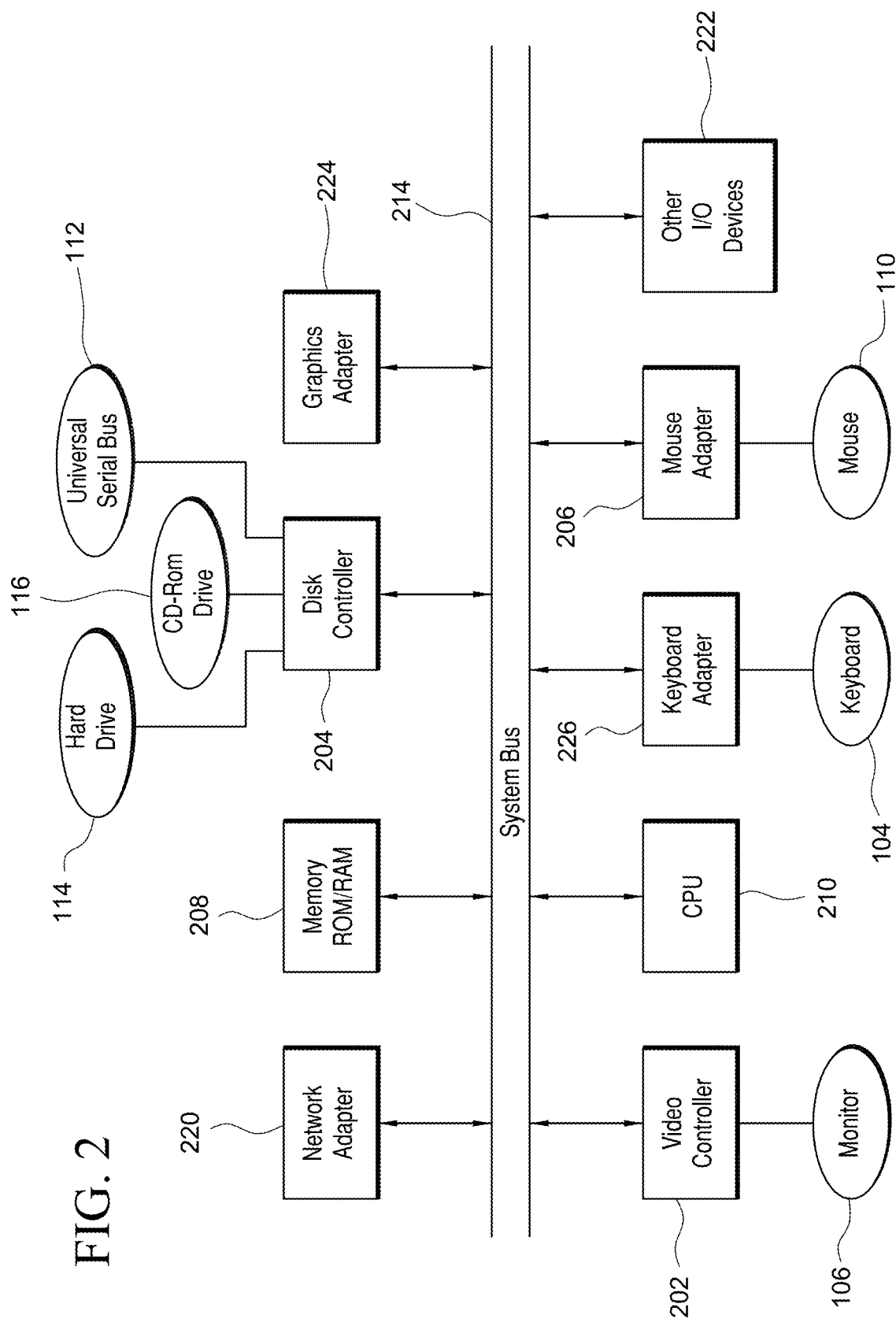
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read-only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
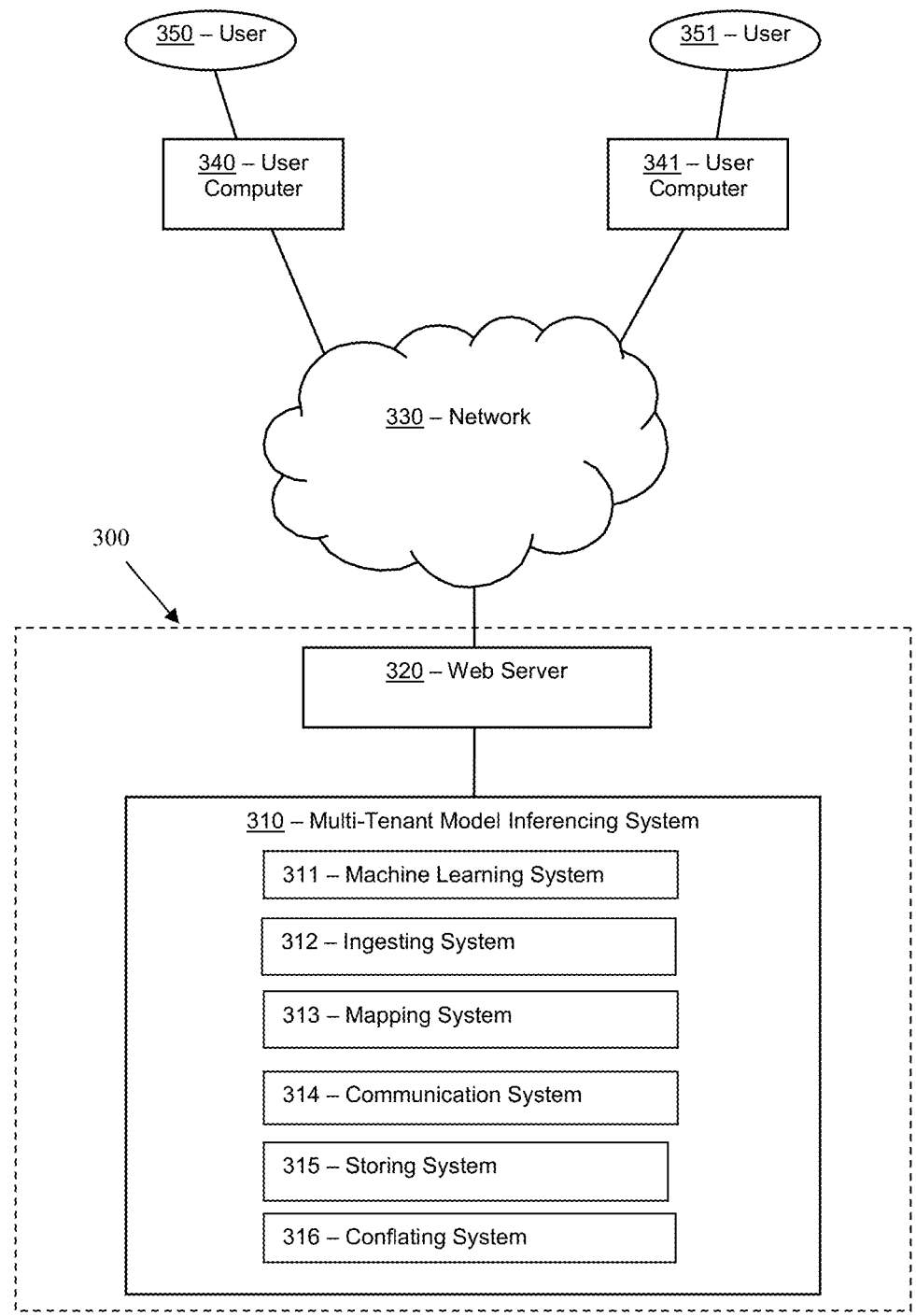
FIG. 3 illustrates a block diagram of a system that can be employed for performing asynchronous multi-tenant model inferencing on streaming databases, according to an embodiment.

Turning ahead in the drawings, FIG. 3 illustrates a block diagram of a system 300 that can be employed for performing asynchronous multi-tenant inferencing for streaming dataset, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a multi-tenant model inferencing system 310 and/or a web server 320. Multi-tenant model inferencing system 310 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, multi-tenant model inferencing system 310 and/or web server 320. Additional details regarding multi-tenant model inferencing system 310 and/or web server 320 are described herein.

In a number of embodiments, each of multi-tenant model inferencing system 310 and/or web server 320 can be a special-purpose computer programed specifically to perform specific functions not associated with a general-purpose computer, as described in greater detail below.

In some embodiments, web server 320 can be in data communication through a network 330 with one or more user computers, such as user computers 340 and/or 341. Network 330 can be a public network, a private network or a hybrid network. In several embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between multi-tenant model inferencing system 310 and/or web server 320 within system 300. Accordingly, in some embodiments, multi-tenant model inferencing system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Figure 4:
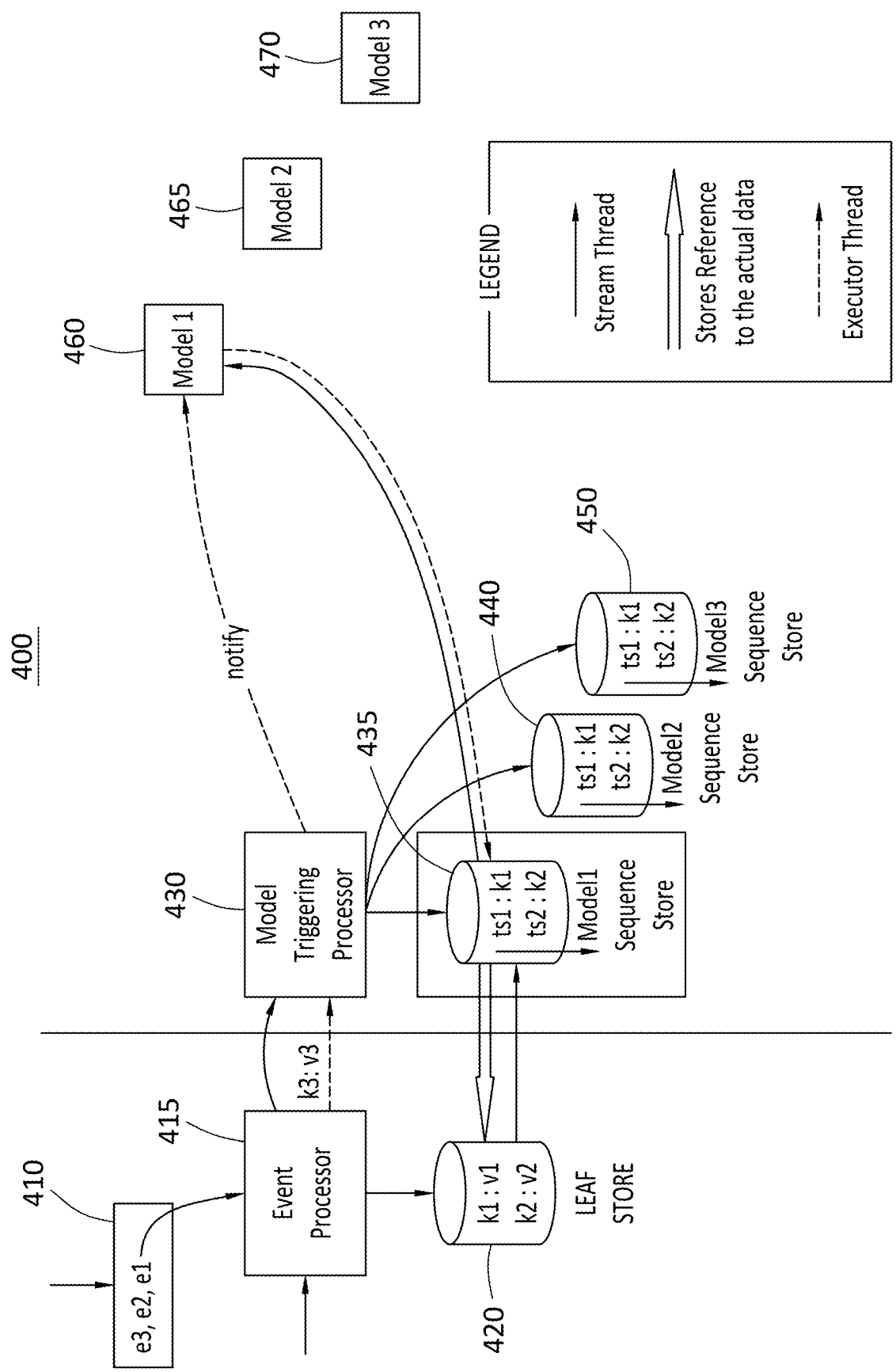
FIG. 4 illustrates a flow chart for a method a flow chart for a method for asynchronous multi-tenant model inferencing conducted by multiple models, according to an embodiment.

Referring to the drawings, FIG. 4 illustrates a flow chart for a method 400 for asynchronous multi-tenant model inferencing conducted by multiple models, according to an embodiment. Method 400 can include receiving streaming events associated with multiple users in real time. Method 400 also can include identifying and/or labeling each streaming event by a user identification (e.g., customer identification) where each streaming event can be mapped to one or more models and/or teams. Method 400 additionally can include each model of multiple models conducting model inferencing concurrently and/or consecutively using independent threads (e.g., streaming threads, executor threads, conflation threads) wherein one event can lead to multiple outputs. Method 400 further can include storing each of the streaming events in a respective sequence store. Method 400 also can illustrate, using a model triggering processor, notifying each model of the multiple models of the one or more streaming events. In some embodiments, the procedures, the processes, and/or the activities of method 400 can be performed in the order presented or in parallel. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as multi-tenant model inferencing system 310 and/or web server 320. The processor(s) can be similar or identical to the processor(s) described above with respect to computer system 100 (FIG. 1).

Figure 5:
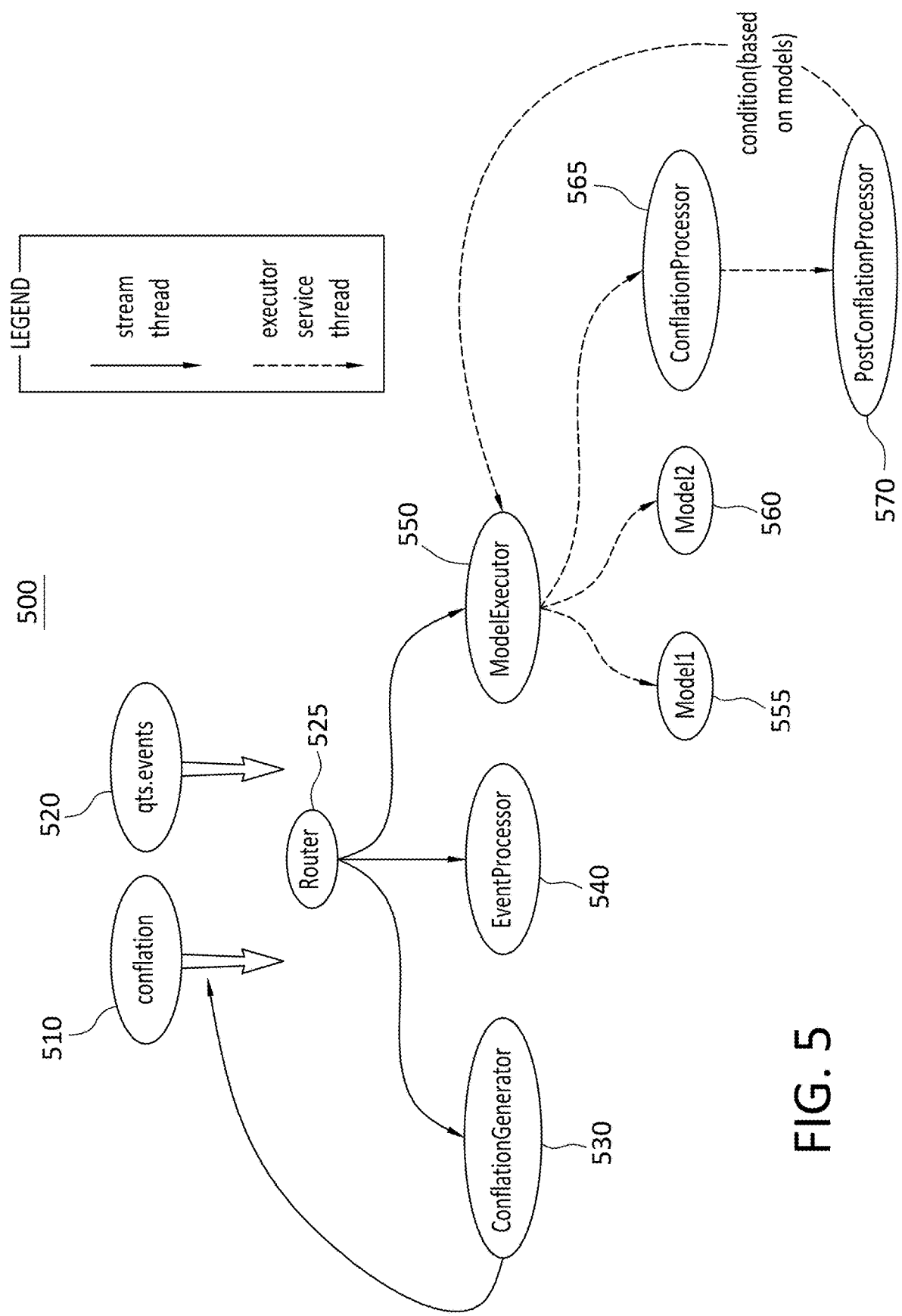
FIG. 5 illustrates a flow chart for a method a flow chart for ingesting multitenancy events, where multiple models can run independently and in parallel on multi-tenant threads, according to an embodiment.

In several embodiments, method 400 can include a block 410 of receiving streaming events in real time, such as "e1" (event 1), "e2" (event 2), "e3" (e.g., e3), and/or another suitable number of streaming events. For example, e1 can include a read command for a user, e2 can include a write command for the same user, and e3 can include another write command for another user. Block 410 can be similar or identical to the activities described in blocks 510 and 520 (FIG. 5, described below). In many embodiments, method 400 can proceed after block 410 to a block 415.

In various embodiments, method 400 also can include block 415 of processing events using an event processor. In several embodiments, the event processor can be configured to run independently at a predetermined pace unaffected by each of the models and/or conflation models. In some embodiments, block 415, using an event processor, can receive and/or store data for each user profile associated with each streaming event and/or each conflation model event. In some embodiments, the event processor can determine that one or more streaming events can be mapped and/or bundled as subsets and/or bundles that are linked (mapped) by common factors. For example, such common factors can include a user profile, a user identification number, other identifiers, a method of payment for a transaction, and/or another suitable type of common factor. In various embodiments, each streaming model (model) and/or conflation model can process a subset of events consecutively, concurrently, using a predetermined sequence and/or a predetermined order. Block 415 can be similar or identical to the activities described in block 540 (FIG. 5, described below). In several embodiments, method 400 can proceed after block 415 to a block 420 and/or a block 430.

In many embodiments, method 400 further can include block 420 of tracking each change in state of each streaming event of multiple streaming events via a leaf store. In some embodiments, the leaf store can tag and/or identify each streaming event by assigning a pre-determined digital key value and/or key associated with a user profile and/or a user identification number assigned to a user. In several embodiments, the digital key value and/or key can be a serialised byte array. In many embodiments, assigning the pre-determined digital key value and/or key can be efficient in terms of improving storage and speed and can provide safety over network transit.

In various embodiments, the leaf store can electronically (e.g., digitally) mark and/or track each update of a respective command of each of the streaming events. In some embodiments, the leaf store can electronically mark or tag each streaming event based on a respective digital key, a digital key value, and/or another suitable type of electronic key. In several embodiments, such tracking updates can be identified by different versions, where each version can include a new timestamp and/or date when the command was processed and/or updated. In various embodiments, some commands can be processed without changing the status of the event, such as a read command, evidenced by a timestamp of the processing event without requiring a new version be marked. In many embodiments, tracking updates can include tracking a read and/or a write command for each streaming event whether the event status is changed and/or updated. In some embodiments, tracking updates can include tracking write commands not read commands as a new version of the streaming event stored in the leaf store. For example, such a digital key value can include a digital signature of a transaction, a secure private key, a public key, a key value pair, and/or another suitable encryption format. In various embodiments, the leaf store also can track respective commands and/or respective instructions translated in each streaming event associated with a respective digital key value and/or a respective key of a user profile and/or a respective user identification number. In some embodiments, each digital key (e.g., digital key value) of each streaming event can be stored and updated in the leaf store and/or one or more model sequence stores. For example, "k1" can indicate a key assigned to a user, "v1" can refer to a version number, "v2" can refer to an updated version of the streaming event after performing a write command, a read command, asynchronous model inferencing, and "ts" can indicate a time stamp when the streaming event was modified and/or read.

In several embodiments, block 420 also can identify each streaming event by a key associated with each leaf store and a version number tracking each change in a state of each streaming event. In various embodiments, each leaf store can access each sequence store, model store, and/or model sequence store to transmit updates and/or new versions of streaming events. In some embodiment, the terms sequence store, model store, and/or model sequence store can be used interchangeably in this application. In many embodiments, the event processor also can access the leaf store for updated versions to transmit the updated versions to a model triggering processor of block 430. Similarly, each model store can transmit to the leaf store data and/or updated data using an identifier, such as the digital key, after each model responds to a command in the model store. In some embodiments, method 400 can proceed after block 420 retuning to block 415 and/or proceeding to one or more of a set of model sequence stores, such as model sequence stores 435, 440, and/or 450.

In several embodiments, method 400 additionally can include block 430 of triggering a processor to notify each of the multiple models, such as models 460, 465, and/or 470. In other embodiments, the multiple models can poll for new events to process. In some embodiments, block 430 also can receive data of each of the streaming events and user profiles from multiple sources, such as block 415 (e.g., event processor) and/or block 420 (e.g., leaf store). In many embodiments, block 430, via a model triggering processor, can wake up each model from a sleep mode or a hibernate mode by transmitting each notification to one or more respective models. In several embodiments, a transmission can include a digital signal, a video signal, and/or another suitable electronic signal of transmission. In various embodiments, upon detecting an electronic notification, each model can wake up from a sleep mode to receive the data from the event transmission to independently respond to the event. In some embodiment, all responses and transactions between each model and a respective model store can be transacted within each independent multi-tenant thread.

In many embodiments, method 400 can proceed after block 430 to one or more of the set of model sequence stores, such as model sequence stores 435, 440, and/or 450 or to one or more of a set of models, such as models 460, 465, and/or 470. Blocks 460, 465, and 470 can be similar or identical to the activities described in blocks 555, 560, and/or 565 (FIG. 5, described below).

In various embodiments, model sequence stores 435, 440, and/or 450 can store one or more events for processing by one or more models, wherein processing can include conducting read/write commands, asynchronous model inferencing, and/or another suitable type of process. In several embodiments, each model sequence store can receive data from multiple streaming events based on a key value, a digital key value, a timestamp value, and/or another streaming event identifier. In some embodiments, each model sequence store can recover (e.g., wake) from a sleep mode by receiving a signal from each model via a respective thread of the multi-tenant threads, such a respective thread can include an independent stream thread and/or an executor thread. In several embodiments, each model sequence store of a set of model sequence stores can transmit stored references and/or data to update the data of the steaming event and/or the user to the leaf store, similar and/or identical to leaf store 420.

In some embodiments, models 460, 465, and/or 470 can each be a process that handles streaming events. In many embodiments, each model of the set of models, can include processing, via a streaming thread, an executor thread, and/or a conflation thread, each event mapped to a respective model sequence store, such as blocks 435, 440, and/or 450. In several embodiments, upon completion of processing the respective model sequence store, each model can return to a sleep mode or hibernation mode until receipt of another notification and/or another notification signal.

In various embodiments, each model of the set of models also can be a conflation model where each model can include conflating data from one or more models based on common factors and/or a size of the streaming events. Such activities of conflation models are further described below in connection with blocks 510, 530, 565, and/or 570 (FIG. 5, described below).

Turning ahead to the drawings, FIG. 5 illustrates a flow chart for a method 500 of ingesting multitenancy events, where multiple models can run independently and in parallel on multi-tenant threads, according to an embodiment. Such multi-tenant threads can include stream threads and/or executor threads (e.g., executor service threads). Method 500 also can include a multitenancy process where one or more of the multiple models can include one or more conflation models. Method 500 can be employed in many different embodiments and/or examples not specifically depicted or described herein. In some embodiments, the procedures, the processes, and/or the activities of method 500 can be performed in the order presented or in parallel. In other embodiments, the procedures, the processes, and/or the activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as multi-tenant model inferencing 310 and/or web server 320. The processor(s) can be similar or identical to the processor(s) described above with respect to computer system 100 (FIG. 1).

In several embodiments, method 500 can include a block 510 of receiving conflation streaming events for processing using multitenancy techniques. In some embodiments, multitenancy techniques can include processing streaming events by running multiple independent threads from one block to another block, independently and in parallel. In various embodiments, each independent thread can run using a stream thread and/or an executor service thread. In some embodiments, a stream thread can be used to transmit data from blocks 510 and 520 to block 525 (e.g., a router). In several embodiments a stream thread can be used to receive data from blocks 510 and 520 to determine where to send the data (e.g., commands and/or instructions) from the router to block 530 (e.g., a conflation generator), block 540 (e.g., event processor) and/or block 550 (e.g., a model executor). In various embodiments, block 550 can use the executor thread, using the model executor, to transmit data to multiple models, such as block 555 (e.g., a model 1), block 560 (e.g., a model 2) block 565 (e.g., a conflation processor) for processing. In several embodiments, block 565 also can transmit data to block 570 (e.g., a post conflation processor) using an executor thread, where the output of the post conflation processor can be transmitted back to block 550 for further processing. In many embodiments, method 500 can proceed after block 510 to a block 525.

In some embodiments, method 500 can include a block 520 of receiving streaming events for processing using multitenancy techniques. For example, block 520 can run an independent stream thread to block 525. In several embodiments, method 500 also can proceed after block 520 to block 525.

In various embodiments, method 500 can include block 525 of routing streaming events received by multiple sources. In some embodiments, block 525 can receive multiple streaming events and/or multiple conflation events from the multiple sources, such multiple sources can include block 510 and/or block 520. In several embodiments, block 525 can route the streaming events based on multitenancy techniques using independent streaming threads to a block 530, a block 540, and/or a block 550. In many embodiments, method 500 can proceed after block 525 to block 530, block 540, and/or block 550.

In some embodiments, method 500 can include block 530 of generating conflation streaming events to multiple conflation models. In several embodiments, each conflation model of the multiple models can be generated by a conflation generator, where each conflation model can be transmitted back to block 510 for further processing as intake data and/or as conflated conflation models. In various embodiments, each conflation model transmitted back to block 510 can be rerouted to block 525 where the conflation model can be routed to block 550 for further processing.

In several embodiments, method 500 can include block 540 of processing streaming events.

In various embodiments, method 500 can include block 550 of executing each of the streaming events, conflation streaming events, and/or conflation models to multiple models, such as a block 555 (model 1), a block 560 (model 2), and/or a block 565 (conflation processor). In several embodiments, block 550 can process the data from the streaming events, conflation streaming events, and/or the conflation models using multiple independent executor service threads. In many embodiments, method 500 can proceed after block 550 to block 555, block 560, and/or block 565.

In some embodiments, method 500 can include blocks 555 and 560 of storing one or more events associated with a user. In several embodiments, blocks 555 and 560 can include processing the events.

In various embodiments, method 500 also can include a block 565 of processing one or more conflation models. In some embodiments, method 500 can proceed after block 565 to a block 570.

In several embodiments, method 500 also can include block 570 of post conflation processing of each of the one or more conflation models. In many embodiments, method 500 can proceed after block 570 returning to block 550.

Figure 6:
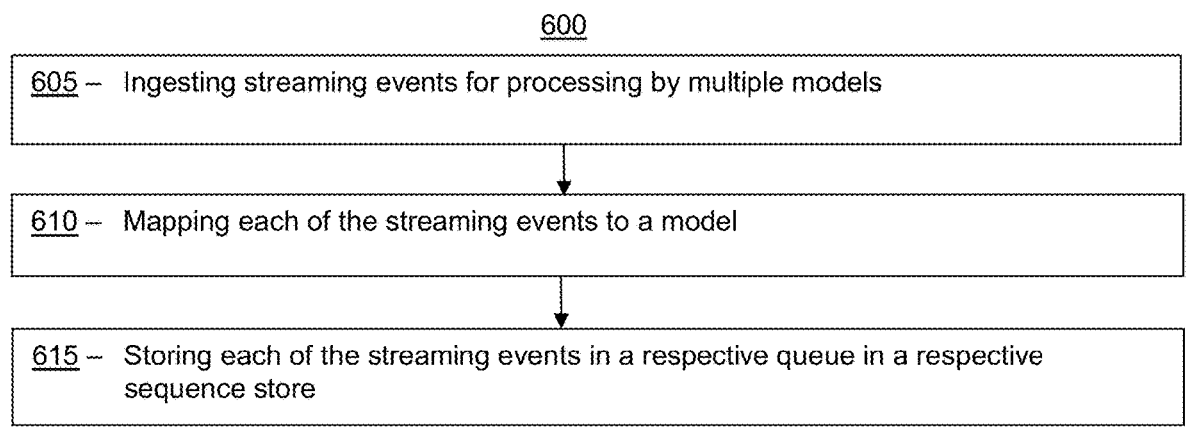
FIG. 6 illustrates a flow chart for a method of performing asynchronous multi-tenant model inferencing on streaming databases, according to another embodiment.

Referring to in the drawings, FIG. 6 illustrates a flow chart for a method 600 of performing asynchronous multi-tenant model inferencing on streaming databases, according to another embodiment. In many embodiments, multiple models run independently and in parallel on multi-tenant threads. Method 600 is merely exemplary and is not limited to the embodiments presented herein. Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such multi-tenant model inferencing system 310 and/or web server 320. The processor(s) can be similar or identical to the processor(s) described above with respect to computer system 100 (FIG. 1).

Referring to FIG. 6, method 600 can include a block 605 of ingesting streaming events for processing by multiple models. In some embodiments, block 605 can include each of the multiple models performing a respective machine-learning inferencing (e.g., machine-learning model inferencing). For example, when a user adds an item to a cart, one or more models of the multiple models can perform a machine learning inference to predict and/or select a product recommendation. In many embodiments, training data for a machine-learning model can include input such as (i) historical customer data sets, such as brands a customer prefers, a size of each item, a price range of each item, and/or another suitable input, and/or (ii) product related data sets, such as top-seller-items, popular items co-bought with an item, and/or another suitable data set. In several embodiments, an output of a machine-learning model can include a probability and/or an inference of an item a user will likely purchase based on the one or more personalized inferences as derived by the data in the input. In many embodiments, the respective machine-learning inferencing can be based on a respective output and a respective training data set for the each of the multiple models. Block 605 can be similar or identical to the activities described in block 410 (FIG. 4), block 415 (FIG. 4), block 510 (FIG. 5), block 520 (FIG. 5), and/or block 525 (FIG. 5).

In some embodiments, block 605 of ingesting streaming events for processing by multiple models also can include receiving the streaming events from multiple sources.

In a number of embodiments, one of the multiple models can include a conflation model. In various embodiments, each conflation model can run inside an executor service in a separate thread (e.g., executor thread), where processing guarantees can be provided by one or more sequence stores and/or model sequence stores. Block 605 can be similar or identical to the activities described in block 510 (FIG. 5).

In several embodiments, the conflation model can perform conflating two or more digital files for the streaming events into conflation states based on one or more data commands. In some embodiments, two or more digital files can be combined based on common features of the two or more models. In several embodiments, the conflation model can perform conflating two or more digital files for the streaming events into conflation states based on one or more data commands. In some embodiments, two or more digital files can be combined based on common features of the two or more models. In various embodiments, common features of the two or more models can include browser cookies, encrypted payment cards etc. For example, a user logging into a website as a guest user can be assigned (e.g., allocated) a new guest user identification. When the same user logs into the same website and used a registered user identification as a registered user, the same cookies can be used to conflate the data files for each of the transactions of the same user based on either the guest identification and/or the registered user identification. Block 605 can be similar or identical to the activities described in block 530 (FIG. 5), block 565 (FIG. 5), and/or block 570 (FIG. 5).

In many embodiments, the conflation model can include transferring an original model state of a streaming event of the streaming events that exceeds a size threshold using a respective conflation thread for event processing on a conflation key. In some embodiments, the conflation model also can include pausing the event processing on the conflation key until transferring the original model state is completed.

In several embodiments, conflation models can store critical data or non-critical data in hop-on stores. In various embodiments, for the each of the streaming events conflated to conflation states, the conflation model further can include, storing one or more column families comprising (i) critical data and (ii) non-critical data in a hop-on store.

In some embodiments, the conflation model additionally can include, for the each of the streaming events conflated to conflation states, transferring the critical data stored in the hop-on store and pipeline data of the streaming events to a conflation state of the conflation states. Block 605 can be similar or identical to the activities described in block 530 (FIG. 5).

In many embodiments, the conflation model also can include, for the each of the streaming events conflated to conflation states, executing a change root for the conflation state from a traceable entity identifier event to a traceable entity graph identifier event. For example, the change root from the traceable entity identifier event (tid) to the traceable entity graph identifier event (tgid) can happen after the critical data transfer along with data from a user profile and then the non-critical data can be transferred.

In various embodiments, the conflation model further can include, conflating the each of the streaming events to conflation states, by running the each of the streaming events at an independent pace unaffected by the conflation states mapped to the multiple models.

In some embodiments, the conflation model also can include, conflating the each of the streaming events to conflation states, by transferring the each of the streaming events to the leaf store. Block 605 can be similar or identical to the activities described in block 420 (FIG. 4).

In many embodiments, the conflation model additionally can include, conflating the each of the streaming events to conflation states, by tracking, via the leaf store, the each of the streaming events associated with each version of the each of the streaming events stored in the respective sequence store in which is stored the each of the streaming events. Block 605 can be similar or identical to the activities described in block 420 (FIG. 4).

In various embodiments, the conflation model also can include, conflating the each of the streaming events to conflation states by identifying the each of the streaming events tagged with at least (i) a key value and (ii) a version number. Block 605 can be similar or identical to the activities described in block 420 (FIG. 4).

For example, a corner case can include hop-on data for two column families with 1 critical data (critical hop-on-data) and 1 non-critical data (non-critical hop-on-data). In such an example, conflating (tid0, tid1) with hop-on data can conflate the events to a final tgid:tid0.

In several embodiments, one or more exemplary use cases for conflating (tid0, tid1) can include the following exemplary approaches:

A pessimistic lock scenario for a streaming event for tid1 can include taking a lock on tid1 prior to writing to an event store so conflation does not take place during a writing event. An optimistic lock scenario for the streaming event for tid1 can include fetching a tgid and the conflation state before writing to the event store where post writing can verify both once again. In such a case of initiating conflation, then either tgid can change or a state can change. If the state as changed to packed, or if tgid changed but the state is a normal state then the event can be routed to a new tgid. In these examples, a similar approach can be taken for models since each model and/or conflation model can run in separate independent threads.

A streaming event for tid0 can receive new data from tid1 using a virtual machine (vm). In such an exemplary scenario, the receipt of new data can be devoid of a problem when the data is received during processing. For example, a tid set (tid0, tid1) can change by adding data for tid1, a tid2 and/or a tid3, where no changes can occur for existing data for tid0, a tid4, and/or a tid5.

A serving request for user profile data of a user on tid1 can include serving the request using independent threads, (e.g., akka threads), thus if a tgid is on a different vm, then the serving request can be rerouted. If the tgid is not rerouted, the serving request can be served from the same vm.

A serving request for data of a user profile of a user on tid0 can receive additional data from tid1, using a vm, where other requests for tid0 can work with current data.

A serving request for critical hop-on data on tid1 can apply the same guarantees to the data, since the data can be transferred along with user profile data. Further, if the serving request also takes place in independent threads (e.g., akka threads), and the tgid is run on a different vm then the serving request can be rerouted, otherwise the serving request can be served from same vm.

A serving request for a crucial hop-on data on tid0, can receive additional data from tid1, using a vm, where other serving requests for tid0 can work with current data.

A serving request for non-critical hop-on data on tid1 can include two alternate approaches including:

Approach 1: There can be a possibility that tgid on tid1 can already be changed to tid0, before the non-critical data reaches tid0, using a vm, since a change root can occur upon receiving both the user profile and the critical hop-on data. Thus, in such a case where the change root occurred, the serving request can be routed to a tid0 node, and can be served from that node. In this scenario, it is not a surety that the non-critical hop-on data processed on the tid0 node by then. Thus, models can include default values for non-critical data for such scenarios (e.g., similar to static pages being loaded on websites) which can be served.

Approach 2: There can be a tgid corresponding to non-critical data which can change when the non-critical data moves. In this scenario, the serving request can continue serving if the serving request can be for a non-critical column family from the tid1, using a vm, until the request moves to a tid0 box.

A serving request for non-critical hop-on dtat on tid0, can receive the additional data from tid1, using a vm, where other requests from tid0 can work with the current data.

A model computation on tid0 prior to the arrival of non-critical data can include a possibility that the model starts inferencing before non-critical data arrives from tid1 to tid0, since the change root can happen with non-critical data, can lead to incomplete inferences. Such a model can include three exemplary approaches including:

Approach 1: Models can write a merging logic to merge the inference derived devoid of non-critical data with the data received from the tid1 node. In some embodiments, when a number of models devoid of such merging logic, such of the models can use available non-critical data.

Approach 2: Models can be checked for arrival or not of non-critical data for a key, since a change root can occur before non-critical data arrives. When a model starts inferencing for tid1 devoid of the arrival of the non-critical data for tid1, further processing on that model can include pausing the inferencing for tid1 until the non-critical data arrives.

Approach 3: Another exemplary scenario can include a secondary sequence store to which a model keeps writing keys devoid of the arrival of non-critical data.

Determining an ordered sequence when a model can process events from a primary sequence store and/or when the model can process events from the secondary sequence store can determine ordering guarantees. For example, multiple events for tid1 can be sent to a secondary sequence store devoid of the arrival of the non-critical data and another single event for tid1 can be sent to a primary sequence store. If the single event is processed first, then the processing of the single event can break ordering guarantees by searching the multiple events for tid1 from the secondary sequence store when the single event is processed leading to additional complexity and operational challenges.

In several embodiments, method 600 also can include a block 610 of mapping each of the streaming events to a model of the multiple models. Block 610 can be similar or identical to the activities described in block 415 (FIG. 4), and/or block 430 (FIG. 4).

In various embodiments, method 600 additionally can include a block 615 of storing each of the streaming events in a respective queue in a respective sequence store of the multiple sequence stores, such that a respective one of the multiple models retrieves (i) a respective one of the streaming events in a respective sequence store associated with the respective one of the multiple models and (ii) a respective key corresponding to the respective one of the streaming events from a leaf store. Block 615 can be similar or identical to the activities described in block 415 (FIG. 4), block 420 (FIG. 4), and/or block 430 (FIG. 4).

In many embodiments, block 615 can include asynchronously performing the respective machine-learning inferencing based on content of the respective one of the streaming events. In several embodiments, the multiple models can run independently and in parallel on multi-tenant threads. Block 615 can be similar or identical to the activities described in blocks 460 to 470 (FIG. 4) and/or blocks 435 to 450 (FIG. 4).

In several embodiments, when the respective queue in the respective sequence store associated with a model of the multiple models stores one of the streaming events, block 615 can include receiving a triggering event that can be sent to the model to wake the model and consume one of the streaming events. Block 615 can be similar or identical to the activities described in block 430 (FIG. 4).

Turning back in the drawings to FIG. 3, multi-tenant model inferencing system 310 is merely exemplary and is not limited to the embodiments presented herein. Multi-tenant model inferencing system 310 can be employed in many different embodiments or examples not specifically depicted or described herein. In some embodiments, certain elements or systems of multi-tenant model inferencing system 310 can perform various procedures, processes, and/or acts. In other embodiments, the procedures, processes, and/or acts can be performed by other suitable elements or systems. In many embodiments, the systems of multi-tenant model inferencing system 310 can be modules of computing instructions (e.g., software modules) stored at non-transitory computer readable media. In other embodiments, the systems of multi-tenant model inferencing system 310 can be implemented in hardware.

In many embodiments, multi-tenant model inferencing system 310 can include a machine learning system 311. In a number of embodiments, machine learning system 311 can at least partially perform block 605 (FIG. 6), each of the multiple models, of performing a respective machine-learning inferencing.

In some embodiments, multi-tenant model inferencing system 310 can include an ingesting system 312. In several embodiments, ingesting system 312 can at least partially perform block 410 (FIG. 4) of receiving streaming events in real time, block 510 (FIG. 5) of receiving conflation streaming events for processing using multitenancy techniques, block 520 (FIG. 5) of receiving streaming events for processing using multitenancy techniques, and/or block 605 (FIG. 6) of ingesting streaming events for processing by multiple models.

In many embodiments, multi-tenant model inferencing system 310 can include a mapping system 313. In a number of embodiments, mapping system 313 can at least partially perform block 420 (FIG. 4) of tracking each change in state of each streaming event of multiple streaming events via a leaf store, block 430 (FIG. 4) of triggering a processor to notify and/or poll each of the multiple models, block 525 (FIG. 5) of routing streaming events received by multiple sources, and/or block 610 (FIG. 6) of mapping each of the streaming events to a model of the multiple models.

In various embodiments, multi-tenant model inferencing system 310 can include a communication system 314. In many embodiments, communication system 314 can at least partially perform blocks 460-470 (FIG. 4) of receiving notifications from block 430 and/or of processing, via a streaming thread and/or a conflation thread, each event mapped to each respective model sequence store, and/or block 615 (FIG. 6) of storing each of the streaming events in a respective queue in a respective sequence store of the multiple sequence stores.

In several embodiments, multi-tenant model inferencing system 310 can include a storing system 315. In some embodiments, storing system 315 can at least partially perform blocks 435, 440, and/or 450, (FIG. 4) of storing one or more events for processing by one or more models, block 530 (FIG. 5) of generating conflation streaming events to multiple conflation models, block 540 (FIG. 5) of processing streaming events, block 550 (FIG. 5) executing each of the streaming events, conflation streaming events, and/or conflation models to multiple models, blocks 555 an 560 (FIG. 5) of storing one or more events associated with a user, and/or block 615 (FIG. 6) of storing each of the streaming events in a respective queue in a respective sequence store of the multiple sequence stores.

In many embodiments, multi-tenant model inferencing system 310 can include a conflating system 316. In a number of embodiments, conflating system 316 can at least partially perform block 530 (FIG. 5) of generating conflation streaming events to multiple conflation models, block 550 (FIG. 5) of executing each of the streaming events, conflation streaming events, and/or conflation models to multiple models, block 565 (FIG. 5) of processing one or more conflation models, and/or block 570 (FIG. 5) of post conflation processing of each of the one or more conflation models.

In several embodiments, web server 320 can at least partially perform sending instructions to user computers (e.g., 350-351 (FIG. 3)) based on information received from communication system 314.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of orders for products and/or items sold on the website can exceed approximately ten million (10,000,000) approximately each day.

In a number of embodiments, the techniques described herein can solve a technical problem that arises only within the realm of computer networks, as running independent threads to respond to one or more stream events requires a computer to translate electronic data and/or respond using electronic data, does not exist outside the realm of computer networks. Moreover, the techniques described herein can solve a technical problem that cannot be solved outside the context of computer networks. Specifically, the techniques described herein cannot be used outside the context of computer networks, in view of a lack of data.

Various embodiments can include a system including one or more processors and one or more non-transitory computer-readable media storing computing instructions configured to run on the one or more processors and perform certain acts. The acts can include ingesting streaming events for processing by multiple models. Each of the multiple models can perform a respective machine-learning inferencing. The acts also can include mapping each of the streaming events to a model of the multiple models. The acts further can include storing each of the streaming events in a respective queue in the respective sequence store of multiple sequence stores. Each respective one of the multiple models can retrieve (i) a respective one of the streaming events in the respective sequence store associated with the respective one of the multiple models and (ii) a respective key corresponding to the respective one of the streaming events from a leaf store to asynchronously perform the respective machine-learning inferencing based on content of the respective one of the streaming events. The multiple models can run independently and in parallel on multi-tenant threads.

A number of embodiments can include a method being implemented via execution of computing instructions configured to run at one or more processors and stored at one or more non-transitory computer-readable media. The method can include ingesting streaming events for processing by multiple models. Each of the multiple models can perform a respective machine-learning inferencing. The method also can include mapping each of the streaming events to a model of the multiple models. The method additionally can include storing each of the streaming events in a respective queue in a respective sequence store of multiple sequence stores. Each respective one of the multiple models can retrieve (i) a respective one of the streaming events in the respective sequence store associated with the respective one of the multiple models and (ii) a respective key corresponding to the respective one of the streaming events from a leaf store to asynchronously perform the respective machine-learning inferencing based on content of the respective one of the streaming events. The multiple models can run independently and in parallel on multi-tenant threads.

Although automatically conducting asynchronous multi-tenant modelling on streaming events has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different modules, in many different orders, and/or one or more of the procedures, processes, or activities of FIGS. 4-6 may include one or more of the procedures, processes, or activities of another different one of FIGS. 4-6.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
   one or more processors; and
   one or more non-transitory computer-readable media storing computing instructions configured to run on the one or more processors and perform:
      ingesting streaming events for processing by multiple models, wherein each of the multiple models performs a respective machine-learning inferencing;
      mapping each of the streaming events to a model of the multiple models; and
      storing each of the streaming events in a respective queue in a respective sequence store of multiple sequence stores, such that a respective one of the multiple models retrieves (i) a respective one of the streaming events in the respective sequence store associated with the respective one of the multiple models and (ii) a respective key corresponding to the respective one of the streaming events from a leaf store, to asynchronously perform the respective machine-learning inferencing based on content of the respective one of the streaming events, wherein the multiple models run independently and in parallel on multi-tenant threads.

2. The system of claim 1, wherein ingesting the streaming events for processing by the multiple models comprises:
   receiving the streaming events from multiple sources.

3. The system of claim 1, wherein one of the multiple models is a conflation model.

4. The system of claim 3, wherein:
   the conflation model performs conflating two or more digital files of the streaming events into conflation states based on one or more data commands; and
   the two or more digital files are combined based on common features of two or more models of the multiple models.

5. The system of claim 3, wherein the conflation model performs:
   transferring an original model state of a streaming event of the streaming events that exceeds a size threshold using a respective conflation thread for event processing on a conflation key; and pausing the event processing on the conflation key until transferring the original model state is completed.

6. The system of claim 3, wherein the conflation model further performs, for the each of the streaming events conflated to conflation states:
storing one or more column families comprising (i) critical data and (ii) non-critical data in a hop-on store;
transferring the critical data stored in the hop-on store and pipeline data of the streaming events to a conflation state of the conflation states; and
executing a change root for the conflation state from a traceable entity identifier event to a traceable entity graph identifier event.

7. The system of claim 6, wherein the conflation model further performs:
running the each of the streaming events at an independent pace unaffected by the conflation states mapped to the multiple models;
transferring the each of the streaming events to the leaf store;
tracking, via the leaf store, the each of the streaming events associated with each version of the each of the streaming events stored in the respective sequence store in which is stored the each of the streaming events; and
identifying the each of the streaming events tagged with at least (i) a key value and (ii) a version number.

8. The system of claim 1, wherein the respective machine-learning inferencing is based on a respective output and a respective training data set for the each of the multiple models.

9. The system of claim 1, wherein the content of the respective one of the streaming events comprises one of a read command or a write command.

10. The system of claim 1, wherein, when the respective queue in the respective sequence store associated with the model of the multiple models stores one of the streaming events, a triggering event is sent to the model to wake the model and consume one of the streaming events.

11. A method being implemented via execution of computing instructions configured to run on one or more processors and stored at one or more non-transitory computer-readable media, the method comprising:
ingesting streaming events for processing by multiple models, wherein each of the multiple models performs a respective machine-learning inferencing;
mapping each of the streaming events to a model of the multiple models; and
storing each of the streaming events in a respective queue in a respective sequence store of multiple sequence stores, such that a respective one of the multiple models retrieves (i) a respective one of the streaming events in the respective sequence store associated with the respective one of the multiple models and (ii) a respective key corresponding to the respective one of the streaming events from a leaf store, to asynchronously perform the respective machine-learning inferencing based on content of the respective one of the streaming events, wherein the multiple models run independently and in parallel on multi-tenant threads.

12. The method of claim 11, wherein ingesting the streaming events for processing by the multiple models comprises:
receiving the streaming events from multiple sources.

13. The method of claim 11, wherein one of the multiple models is a conflation model.

14. The method of claim 13, wherein:
the conflation model performs conflating two or more digital files of the streaming events into conflation states based on one or more data commands; and
the two or more digital files are combined based on common features of two or more models of the multiple models.

15. The method of claim 13, wherein the conflation model performs:
transferring an original model state of a streaming event of the streaming events that exceeds a size threshold using a respective conflation thread for event processing on a conflation key; and
pausing the event processing on the conflation key until transferring the original model state is completed.

16. The method of claim 13, wherein the conflation model further performs, for the each of the streaming events conflated to conflation states:
storing one or more column families comprising (i) critical data and (ii) non-critical data in a hop-on store;
transferring the critical data stored in the hop-on store and pipeline data of the streaming events to a conflation state of the conflation states; and
executing a change root for the conflation state from a traceable entity identifier event to a traceable entity graph identifier event.

17. The method of claim 16, wherein the conflation model further performs:
running the each of the streaming events at an independent pace unaffected by the conflation states mapped to the multiple models;
transferring the each of the streaming events to the leaf store;
tracking, via the leaf store, the each of the streaming events associated with each version of the each of the streaming events stored in the respective sequence store in which is stored the each of the streaming events; and
identifying the each of the streaming events tagged with at least (i) a key value and (ii) a version number.

18. The method of claim 11, wherein the respective machine-learning inferencing is based on a respective output and a respective training data set for the each of the multiple models.

19. The method of claim 11, wherein the content of the respective one of the streaming events comprises one of a read command or a write command.

20. The method of claim 11, wherein, when the respective queue in the respective sequence store associated with the model of the multiple models stores one of the streaming events, a triggering event is sent to the model to wake the model and consume one of the streaming events.

* * * * *